(12) United States Patent
Zeng et al.

(10) Patent No.: US 12,313,015 B2
(45) Date of Patent: May 27, 2025

(54) INTERNAL COMBUSTION ENGINE WITH EXTERNAL CIRCULATION SYSTEM AND WORKING METHOD THEREOF

(71) Applicant: XI'AN JIAOTONG UNIVERSITY, Xi'an (CN)

(72) Inventors: Ke Zeng, Xi'an (CN); Hao Duan, Xi'an (CN); Xiaojun Yin, Xi'an (CN)

(73) Assignee: XI'AN JIAOTONG UNIVERSITY, Xi'an (CN)

(*) Notice: Subject to any disclaimer, the term of this patent is extended or adjusted under 35 U.S.C. 154(b) by 0 days.

(21) Appl. No.: 18/752,904

(22) Filed: Jun. 25, 2024

(65) Prior Publication Data
US 2025/0027458 A1   Jan. 23, 2025

(30) Foreign Application Priority Data

Jul. 21, 2023  (CN) .......................... 202310903013.9

(51) Int. Cl.
*F02D 41/00* (2006.01)
*F01N 3/20* (2006.01)
(Continued)

(52) U.S. Cl.
CPC ....... *F02D 41/0077* (2013.01); *F01N 3/2033* (2013.01); *F02D 41/401* (2013.01);
(Continued)

(58) Field of Classification Search
CPC ........ F02M 26/03; F02M 26/05; F02M 26/16; F02M 26/35; F02M 26/38; F02M 26/39; F02M 31/042; F02M 31/13; F02M 31/163; F02D 2200/0414; F02D 41/0077; F02D 41/064

See application file for complete search history.

(56) References Cited

U.S. PATENT DOCUMENTS 5,076,248 A * 12/1991 Schatz ...................... F01P 3/20
                                                  60/599
6,266,956 B1 * 7/2001 Suzuki .................. F01N 3/0871
                                                  60/284

(Continued)

FOREIGN PATENT DOCUMENTS

CN         109538347 A  *  3/2019  ................ F01L 1/34
CN         111022223 A  *  4/2020  ........... F02M 31/042
(Continued)

Primary Examiner — John M Zaleskas
(74) Attorney, Agent, or Firm — Bayramoglu Law Offices LLC

(57) ABSTRACT

An internal combustion engine with an external circulation system and a working method thereof are provided. The internal combustion engine is externally connected to the external circulation system through an intake port and an exhaust port. The external circulation system is capable of operating in a circulating manner when the internal combustion engine is not running, a significant raise in intake temperature is achieved during intake heating or exhaust heating, thereby the cold start-up performance of the internal combustion engine is improved and harmful emissions during cold start-up is reduced, and a compression ignition working mode of a low compression ratio engine is facilitated to be achieved.

1 Claim, 3 Drawing Sheets

(51) Int. Cl.
   *F02D 41/38*  (2006.01)
   *F02D 41/40*  (2006.01)
   *F02M 31/04*  (2006.01)

(52) U.S. Cl.
   CPC .......... *F02M 31/04* (2013.01); *F02M 31/042* (2013.01); *F02D 2041/389* (2013.01); *F02D 2200/0414* (2013.01)

(56) References Cited

U.S. PATENT DOCUMENTS

| | | | |
|---|---|---|---|
| 10,859,045 B1* | 12/2020 | Smith | F02M 31/10 |
| 2002/0029771 A1* | 3/2002 | Suzuki | F02M 31/163 |
| | | | 123/551 |
| 2003/0168033 A1* | 9/2003 | Hunt | F02M 35/10078 |
| | | | 123/179.15 |
| 2004/0144337 A1* | 7/2004 | Wakao | F02M 25/12 |
| | | | 123/3 |
| 2005/0045118 A1* | 3/2005 | Wakao | F02M 27/02 |
| | | | 123/3 |
| 2007/0193565 A1* | 8/2007 | Brevick | F02D 41/0082 |
| | | | 60/320 |
| 2008/0110419 A1* | 5/2008 | Sakurai | F02D 19/0628 |
| | | | 123/3 |
| 2008/0276913 A1* | 11/2008 | Zubeck | F02D 29/02 |
| | | | 123/549 |
| 2009/0249783 A1* | 10/2009 | Gokhale | F02M 31/08 |
| | | | 60/602 |
| 2009/0271094 A1* | 10/2009 | Stablein | F02B 37/12 |
| | | | 60/605.2 |
| 2010/0043428 A1* | 2/2010 | Stablein | F02B 37/22 |
| | | | 60/297 |
| 2011/0132334 A1* | 6/2011 | Lippa | F02M 26/28 |
| | | | 123/586 |
| 2011/0132336 A1* | 6/2011 | Pursifull | F02M 26/28 |
| | | | 123/184.56 |
| 2011/0146233 A1* | 6/2011 | Carlill | F02D 41/3836 |
| | | | 60/285 |
| 2011/0146244 A1* | 6/2011 | Farman | F02D 9/04 |
| | | | 60/287 |
| 2011/0146245 A1* | 6/2011 | Farman | F02D 41/029 |
| | | | 60/299 |
| 2011/0146246 A1* | 6/2011 | Farman | F01N 9/002 |
| | | | 60/286 |
| 2013/0298530 A1* | 11/2013 | Carlill | F02D 41/0055 |
| | | | 60/274 |
| 2015/0152817 A1* | 6/2015 | Roth | F02M 31/042 |
| | | | 123/435 |
| 2017/0234275 A1* | 8/2017 | Sellnau | F02M 31/135 |
| | | | 123/549 |
| 2019/0323457 A1* | 10/2019 | Rohrssen | F02M 31/08 |
| 2020/0141366 A1* | 5/2020 | Quix | F02M 31/042 |
| 2022/0034283 A1* | 2/2022 | Andersson | F01N 3/2006 |

FOREIGN PATENT DOCUMENTS

| | | | | |
|---|---|---|---|---|
| DE | 102013003457 A1 | * | 9/2014 | ............ F02D 19/02 |
| DE | 102019203849 A1 | * | 9/2020 | |
| FR | 2869648 A1 | * | 11/2005 | ............ F02M 26/05 |
| JP | S6412014 A | * | 1/1989 | |
| JP | H0921362 A | * | 1/1997 | |
| JP | 2009115068 A | * | 5/2009 | |
| WO | WO-2004044401 A1 | * | 5/2004 | ......... F02B 29/0418 |
| WO | WO-2018113988 A1 | * | 6/2018 | |

* cited by examiner

INTERNAL COMBUSTION ENGINE WITH EXTERNAL CIRCULATION SYSTEM AND WORKING METHOD THEREOF

CROSS REFERENCE TO THE RELATED APPLICATIONS

This application is based upon and claims priority to Chinese Patent Application No. 202310903013.9, filed on Jul. 21, 2023, the entire contents of which are incorporated herein by reference.

TECHNICAL FIELD

The present application relates to the technical field of internal combustion engines and, more particularly, to an internal combustion engine with an external circulation system and a working method thereof.

BACKGROUND

The existing internal combustion engine aims to have better energy saving and environmental protection requirements and further hopes to combust alternative fuels, such as methanol.

At present, the rotary engine is difficult to achieve a large effective compression ratio due to its special geometric structure and large air leakage. Generally, the effective compression ratio of the rotary engine is less than 9, so it is difficult to achieve the compression-ignition working method for diesel.

The spark-ignition methanol engine has the problems of difficult low-temperature start-up and difficult treatment of harmful gas emissions during start-up and warm-up. At present, the intake electric heating has been used to raise the intake temperature to tackle the technical problem of low-temperature start-up performance. However, it requires a long period to obtain a higher intake temperature and the engine should be kept in the state of being dragged by the starting motor, thus the existing vehicle rechargeable battery is difficult to meet the requirements.

SUMMARY

An object of the present application is to provide an internal combustion engine with an external circulation system and a working method thereof. The external circulation system is composed of the intake and exhaust ports of the internal combustion engine through connecting pipelines and valves, thus the internal combustion engine can work circularly when it is running or not, and the temperature of the intake air can be raised and kept high. By substantially raising the intake temperature, the problem that a diesel compression ignition working mode cannot be achieved in a low compression ratio engine can be solved.

In order to achieve the above object, the following technical solutions are used by the present application.

An internal combustion engine with an external circulation system of the present application includes:
  an external circulation system being communicated with an intake port and an exhaust port of the internal combustion engine;
  the external circulation system includes:
  an intake heating assembly, an exhaust assembly and a connecting assembly;
  the intake heating assembly is communicated with the intake port of the internal combustion engine and/or the connecting assembly through a connecting assembly pipeline;
  the intake heating assembly includes a fan and an air filter, and an intake connecting pipeline group being communicated with an outlet of the fan; the fan is communicated with the intake port of the internal combustion engine and/or the connecting assembly through the intake connecting pipeline group;
  the exhaust assembly contains an exhaust pipe being communicated with the exhaust port of the internal combustion engine;
  gas output by the intake heating assembly through the connecting assembly and/or the exhaust port of the internal combustion engine is discharged through the exhaust pipe of the exhaust assembly.

The connecting assembly includes a connecting assembly pipeline and a first flow regulation valve disposed on the connecting assembly pipeline, the connecting assembly is connected to the intake heating assembly and the exhaust assembly to control opening and closing of the connecting assembly pipeline through the first flow regulation valve.

Further, the intake connecting pipeline group includes:
  a first intake connecting pipeline; and a second flow regulation valve is mounted on the first intake connecting pipeline to control opening and closing of the first intake connecting pipeline through the second flow regulation valve.

Further, an electric heater and a fuel injector are mounted on the first intake connecting pipeline, and the fuel injector injects fuel into the electric heater to achieve combustion of the fuel injected and release energy to raise the intake temperature; and
  the first intake connecting pipeline is communicated with the intake port of the internal combustion engine to deliver air into the internal combustion engine or the first intake connecting pipeline is communicated with the connecting assembly pipeline to deliver the air to the connecting assembly.

Further, the intake connecting pipeline group further includes a second intake connecting pipeline and a heat exchanger bypassed at two ends of the second flow regulation valve;
  a third flow regulation valve is mounted on the second intake connecting pipeline to control opening and closing of the second intake connecting pipeline through the third flow regulation valve; and
  the second intake connecting pipeline is communicated with an outer port of the heat exchanger and is communicated with the first intake connecting pipeline, an inner port of the heat exchanger is communicated with the exhaust pipe.

Further, an intake oxidation catalyst is disposed downstream of the electric heater, and the intake oxidation catalyst further oxidizes un-combusted fuel injected from the fuel injector to further raise the intake temperature.

Further, the exhaust assembly further includes:
  an exhaust after-treatment device mounted to an exhaust end of the exhaust pipe.

In the above technical solution, an internal combustion engine with an external circulation system provided by the present application has the following beneficial effects:
  the internal combustion engine of the present application is externally connected to the external circulation system through the intake and exhaust ports. The external circulation system is capable of operating in a circulating manner when the internal combustion engine is not running, a significant increase in intake temperature is achieved during intake heating or exhaust heating, thereby the cold start-up performance of the internal combustion engine is improved and harmful emissions during cold start-up is reduced, and a compression ignition working mode of a low compression ratio engine is facilitated to be achieved.

BRIEF DESCRIPTION OF THE DRAWINGS

In order to illustrate the technical solutions in the embodiments of the present application or the related art more clearly, a brief description will be given below concerning the drawings needed to be used in the embodiments. The drawings in the description below are only some embodiments of the present application, and a person skilled in the art may obtain other drawings according to these drawings.

Figure 1:
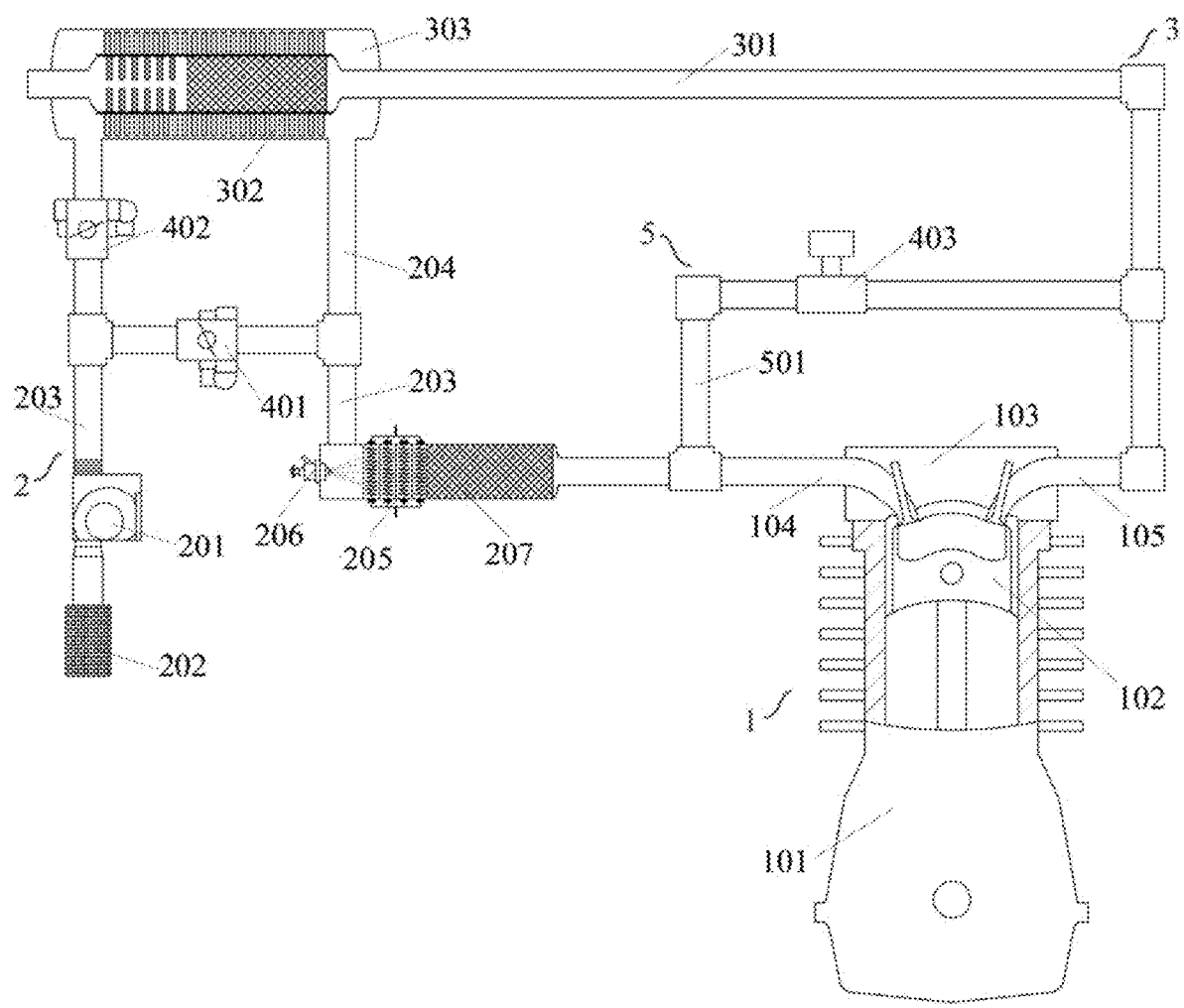
FIG. 1 is a schematic structural diagram of an internal combustion engine with an external circulation system according to an embodiment of the present application.

DESCRIPTION OF REFERENCE NUMERALS 1, engine; 2, intake heating assembly; 3, exhaust assembly; 5, connecting assembly;
101, engine body; 102, piston; 103, cylinder head; 104, intake port; 105, exhaust port;
201, fan; 202, air filter; 203, first intake connecting pipeline; 204, second intake connecting pipeline; 205, electric heater; 206, fuel injector; 207, intake oxidation catalyst;
301, exhaust pipe; 302, exhaust after-treatment device; 303, heat exchanger;
401, second flow regulation valve; 402, third flow regulation valve; 403, first flow regulation valve; and
501, connecting assembly pipeline.

DETAILED DESCRIPTION OF THE EMBODIMENTS

In order to enable a person skilled in the art to better understand the technical solution of the present application, the present application will be described in further detail in combination with the drawings.

Figure 2:
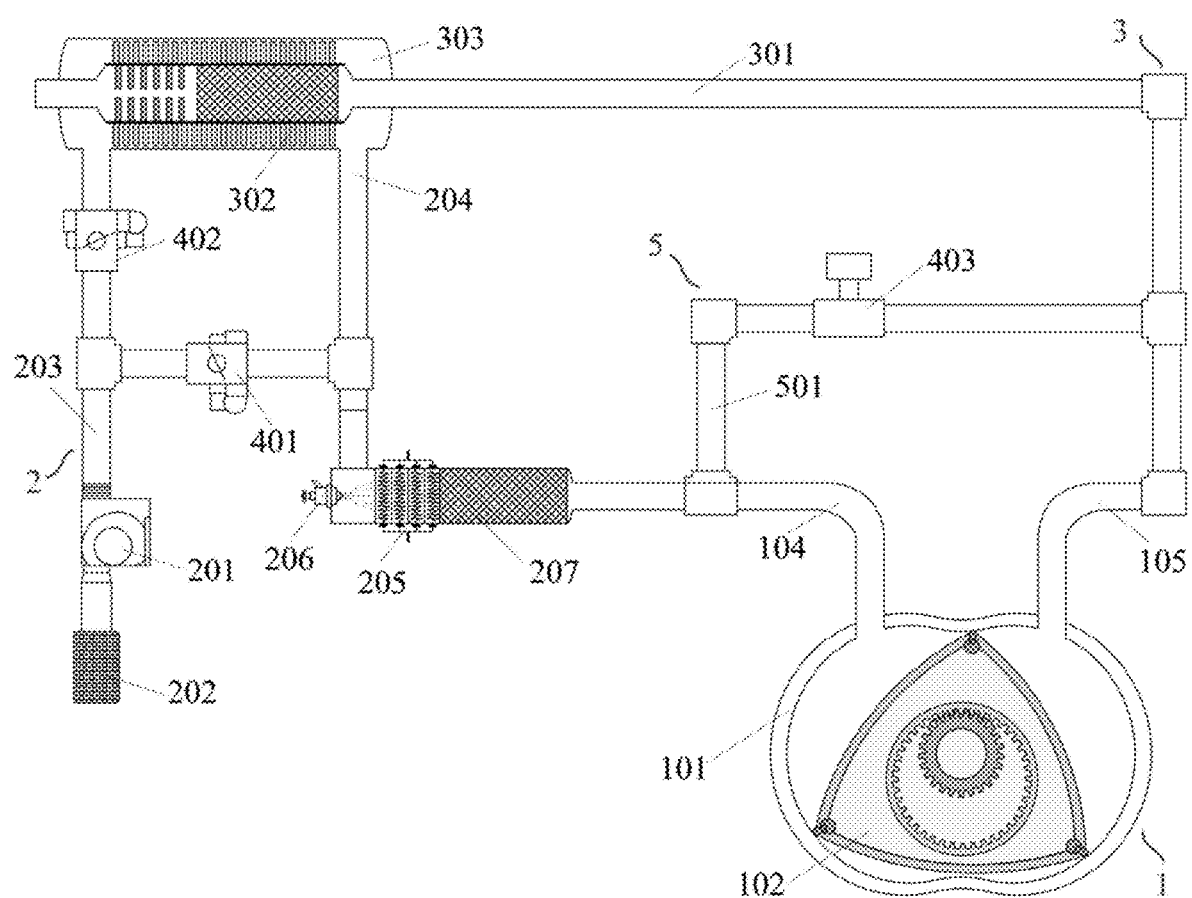
FIG. 2 is a schematic structural diagram of an internal combustion engine with an external circulation system in the embodiment 2 of the present application.
Figure 3:
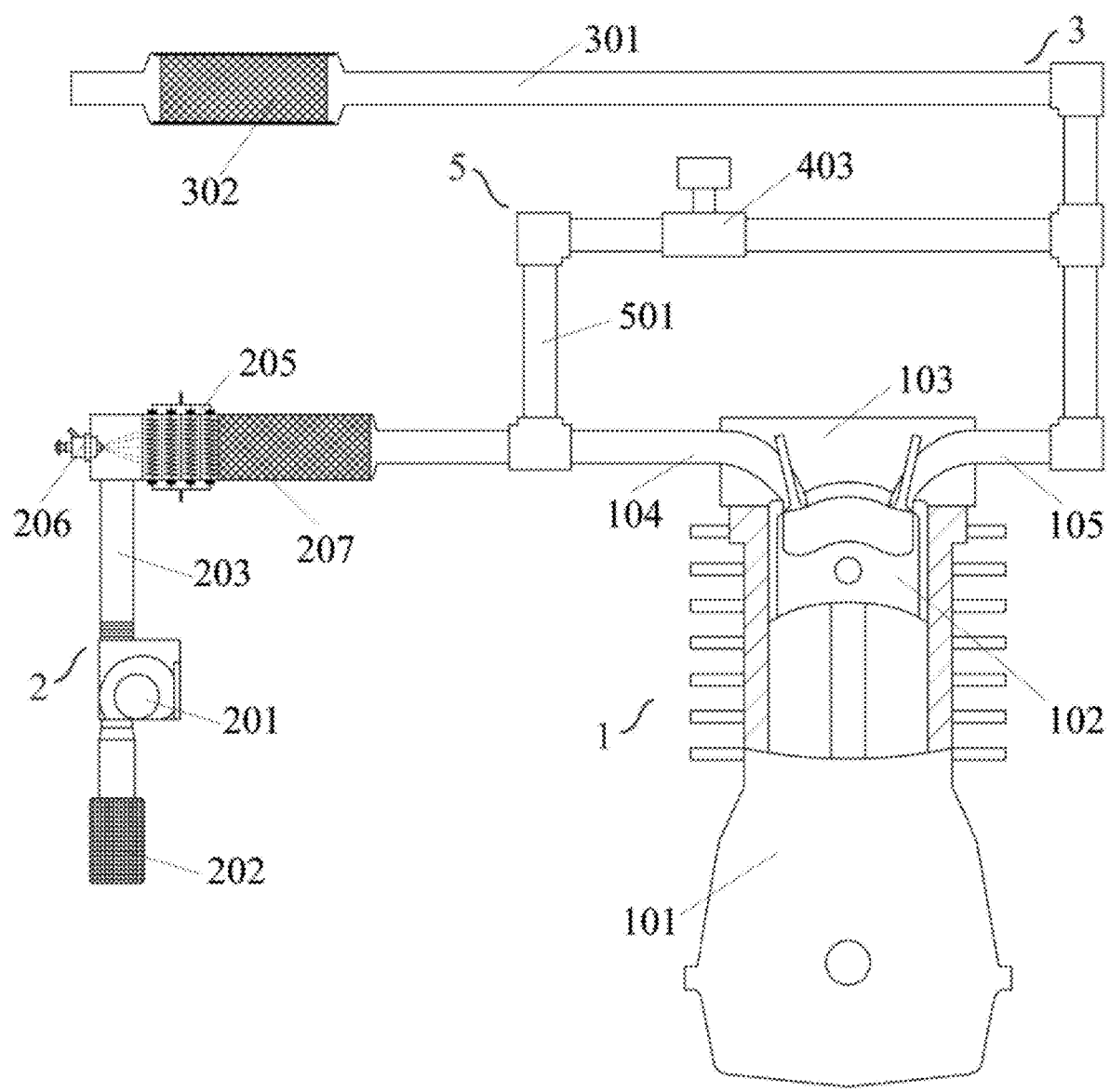
FIG. 3 is a schematic structural diagram of an internal combustion engine with an external circulation system in the embodiment 1 and embodiment 3 of the present application.

Referring to FIGS. 1 to 3:

An internal combustion engine with an external circulation system is provided by the embodiment, which includes:
an external circulation system being communicated with an intake port 104 and an exhaust port 105 of the internal combustion engine.
The external circulation system includes:
an intake heating assembly 2, an exhaust assembly 3 and a connecting assembly 5;
the intake heating assembly 2 is communicated with the intake port 104 of the internal combustion engine and/or the connecting assembly 5 through connecting pipelines;
the intake heating assembly 2 includes a fan 201 and an air filter 202, and an intake connecting pipeline group being communicated with an outlet of the fan 201, the fan 201 is communicated with the intake port 104 of the internal combustion engine and/or the connecting assembly 5 through the intake connecting pipeline group.

The exhaust assembly 3 has an exhaust pipe 301 being communicated with the exhaust port 105 of the internal combustion engine.

The gas output by the intake heating assembly 2 through the connecting assembly 5 and/or the exhaust port 105 of the internal combustion engine is discharged through the exhaust pipe 301 of the exhaust assembly 3.

The connecting assembly 5 includes a connecting assembly pipeline 501 and a first flow regulation valve 403 disposed on the connecting assembly pipeline 501, the connecting assembly is connected to the intake heating assembly 2 and the exhaust assembly 3 to control opening and closing of the connecting assembly pipeline 501 through the first flow regulation valve 403.

Specifically, the internal combustion engine provided by the embodiment is externally connected to an external circulation system, which is mainly communicated with the intake port 104 of the internal combustion engine and the exhaust port 105 through connecting assembly pipelines and necessary valves to form the external circulation system of the present application, namely, a gas flow circulation outside the internal combustion engine. Combustion of gas and fuel takes place outside the internal combustion engine, which is called external circulation, while circulation of gas into and out of the internal combustion engine is called internal circulation. In the present embodiment, by designing the external circulation system, the gas and the fuel flow and combust in the external circulation system, the engine may be warmed up and maintained at a high gas temperature under the conditions of running and non-running; the catalyst in the exhaust after-treatment device 302 of the external circulation system may be heated to a normal operating temperature (generally above 300° C.) before the engine runs, thereby the problems of low-temperature start-up of the engine and heating up of the exhaust post-processor are solved, and the problem of after-treatment device of harmful emissions during low-temperature start-up is solved. The problem that a diesel compression ignition working mode cannot be achieved in a low compression ratio engine, such as a rotary engine, can be solved by substantially raising the intake temperature (for example, 200° C.).

The engine 1 of the internal combustion engine of the present application is composed of an engine body 101, a piston 102, and a cylinder head 103, and is communicated with the intake port 104 and the exhaust port 105 through a cylinder head 103 of the internal combustion engine. When the internal combustion engine is running and working, after air or an air-fuel mixture passes through the intake port 104 and enters the cylinder, the air or the air-fuel mixture combusts to perform work, and the exhaust gas generated by combustion is discharged via the exhaust port 105 into the exhaust assembly 3 for discharging.

The intake connecting pipeline group of the present embodiment includes:
a first intake connecting pipeline 203; and
a second flow regulation valve 401 is mounted on the first intake connecting pipeline 203 to control opening and closing of the first intake connecting pipeline 203 through the second flow regulation valve 401.

The above is the first implementation of the present application, namely, the intake heating assembly 2 mainly includes the first intake connecting pipeline 203.

Optionally, an electric heater 205 and a fuel injector 206 are mounted on the first intake connecting pipeline 203, and the fuel injector 206 injects fuel into the electric heater 205 to achieve combustion of the fuel injected and release energy to raise the intake temperature. The first intake connecting pipeline 203 is communicated with the intake port 104 of the internal combustion engine to deliver air into the internal combustion engine or the first intake connecting pipeline 203 is communicated with the connecting assembly pipeline 501 to deliver air to the connecting assembly 5.

The connecting assembly pipeline 501 is communicated with the first intake connecting pipeline 203 and the exhaust pipe 301.

An intake oxidation catalyst 207 is disposed downstream of the electric heater 205.

Referring to FIG. 3, the solution of the embodiment 1 may further reduce harmful emissions during the cold start-up of a gasoline engine.

Specifically, the volatility of gasoline is relatively poor at low temperatures. In order to form a better air-fuel mixture, a relatively large amount of fuel is generally injected during the start-up. Since the after-treatment device catalyst for exhaust gas does not reach a normal operating temperature during the start-up, harmful emissions during the cold start-up and warm-up of the engine 1 are very high. The solution of the embodiment 1 may effectively solve the problem of harmful emissions during the cold start-up and warm-up of the engine 1, and the specific working process is as follows:

the external circulation system is opened before the engine 1 runs to heat intake air to raise the intake temperature, in particular to raise a temperature of a catalyst in an exhaust after-treatment device 302 in an exhaust pipe 301 for exhaust gas to make the catalyst reach a temperature condition for processing the exhaust gas. Wherein a specific working process of the external circulation system of the embodiment 1 is as follows: when the engine 1 is not running, an electric heater 205 is opened and the third flow regulation valve 402 is fully opened; after a temperature of the electric heater 205 reaches a temperature capable of igniting a small amount of the fuel injected by a fuel injector 206, the small amount of fuel starts to be injected, the fuel starts to combust under an action of a high temperature of the electric heater 205, and the temperature of the electric heater 205 and a temperature of an intake oxidation catalyst 207 are further increased by heat released from the fuel; the fan 201 is opened to feed circulating air while injecting the small amount of fuel, an amount of the circulating air fed is adapted to an amount of the fuel injected. Under an action of continuous electric heating and fuel combustion, the intake temperature raises, and the temperature of the catalyst of the exhaust after-treatment device 302 continuously increases. At this moment, the engine 1 starts to run, and the engine 1 does not need to run at a high fuel-air mixing ratio, and harmful exhaust gas discharged from the engine 1 is capable of being timely and effectively treated by the catalyst of the high temperature exhaust after-treatment device, thus emissions of the exhaust gas of the engine 1 is reduced. The system of the embodiment 1 is suitable for reducing emissions during cold start-up and warm-up of gasoline engines without the need to use the heat exchanger 303 mounted on the exhaust port 105, therefore the system may be simplified to the structure shown in FIG. 3.

Embodiment 2

Optionally, the intake connecting pipeline group of the embodiment 2 further includes a second intake connecting pipeline 204, as shown in FIGS. 1 and 2.

A third flow regulation valve 402 is mounted on the second intake connecting pipeline 204 to control opening and closing of the second intake connecting pipeline 204 through the third flow regulation valve 402.

The second intake connecting pipeline 204 is communicated with an outer passage of the heat exchanger 303 and is communicated with the first intake connecting pipeline, an inner passage of the heat exchanger 303 is communicated with the exhaust pipe 301.

An intake oxidation catalyst 207 is disposed downstream of the electric heater 205, and the intake oxidation catalyst 207 further oxidizes un-combusted fuel injected from the fuel injector to further raise the intake temperature.

The exhaust assembly 3 includes:

an exhaust after-treatment device 302 mounted to an exhaust of the exhaust pipe 301.

The embodiment 2 further defines the structure of the external circulation system in combination with the system composition of the embodiment 1 as described above.

Referring to FIG. 2, the system of the embodiment 2 may solve the problem that the low compression ratio engine 1, such as the rotary engine 1, achieves the compression ignition working mode.

The rotary engine is difficult to achieve a large effective compression ratio due to its special geometric structure and large air leakage amount. Generally, the effective compression ratio is less than 9, which makes it difficult to achieve the compression ignition working mode for diesel.

When the engine 1 needs to be started up, the external circulation system is opened to heat the intake air of the engine 1 and warm up the exhaust after-treatment device 302 rather than running the engine 1 first; a specific process is as follows: a third flow regulation valve 402 is closed and the electric heater 205 is opened; after the temperature of the electric heater 205 reaches a temperature capable of igniting the fuel injected by the fuel injector 206, for example, 650° C., the fuel injector 206 injects the fuel, and at a same time, the fan 201 is opened to make the fan 201 to supply air, wherein an air volume of the fan 201 is required to meet the requirements of fuel combustion without lowering the intake temperature and the temperature of the heater due to the excessive air volume, and fuel in the gas formed after heating and combustion is sufficiently oxidized by the intake oxidation catalyst to release heat, so that gas temperature is further raised; since the engine 1 is not running at this moment, the combusted gases can only enter the exhaust pipe 301 of the external circulation system through the first flow regulation valve 403 to reach the exhaust after-treatment device 302 located on the inner wall of the heat exchanger 303, and the catalyst of the exhaust after-treatment device 302 is heated. As the external circulation continuously proceeds, the temperature of air reaching the connecting assembly pipeline 501 further raises; when the temperature reaches a preset temperature T1, for example, 180° C., at this moment, the engine 1 starts to run, and the first flow regulation valve 403 is closed, so that the heated gas completely enters the engine 1. After the engine 1 runs for a plurality of cycles, the temperature T2 of the gas discharged the engine reaches a certain value, for example, 260° C.; at this moment, the fuel is injected at an end of the compression stroke in a cylinder of the engine 1. Since the temperature of the gas in the cylinder after compression exceeds an auto-ignition temperature of the fuel, the fuel ignites and combusts. That the combustion works further promotes the running of the engine 1, the process of the engine 1 from start-up to stable running is achieved.

After the engine 1 starts up and stably runs, the temperature of exhaust gas discharged from the exhaust port 105 of the engine 1 further raises, and the exhaust gas passes through the exhaust pipe 301 to the exhaust after-treatment device 302 for harmless treatment and further releasing the heat; at this moment, the third flow regulation valve 402 is opened and a second flow regulation valve 401 is closed; the intake air passes through a heat exchanger 303 and is heated by the high-temperature exhaust in the heat exchanger 303, and this part of air passes through the pipeline and also reaches to the electric heater 205; in response to the temperature of the air passing through the first intake connecting pipeline 203 having reached or exceeded the preset temperature T1, the electric heater 205 stops heating, and the intake temperature of the engine 1 may reach the preset temperature T1 only by relying on the heating of the intake by the exhaust of the engine 1. At the same time, the engine 1 has been started up and stably run and it is also possible to adjust a heating effect of the exhaust on the intake air by delaying fuel injection start time to regulate the exhaust temperature, so that the gas temperature reaching the intake port 104 of the engine 1 is maintained above the preset temperature T1, thereby temperature conditions required for the in-cylinder fuel compression ignition are ensured.

When the engine 1 enters a medium-load or large-load state, due to a high exhaust temperature, the heat exchanger 303 has a significant heating effect on the intake air. At this moment, if the intake temperature is too high, the power of the engine 1 may be greatly affected. At this moment, the third flow regulation valve 402 may be fully or partially closed, and the second flow regulation valve 401 is opened to regulate the intake temperature, so that the intake temperature is maintained at about the preset temperature T1, the condition of the intake temperature required for fuel compression ignition is ensured, and it is enabled that the engine 1 has good performance parameters at the same time. Referring to FIG. 3:

Embodiment 3 may solve the problem of low-temperature start-up of a spark-ignition methanol engine and greatly reduce harmful emissions during the start-up of the spark-ignition methanol engine.

The external circulation is firstly used to heat the catalyst of the exhaust after-treatment device 302 before the engine 1 runs, and at the same time, the intake temperature is raised; as the external circulation proceeds, when the exhaust after-treatment device 302 reaches a relatively high temperature, for example, 300° C., and the intake air reaches a relatively high temperature, for example, above 50° C., at this moment, the engine 1 is started to run, the engine 1 may be started up smoothly and the emissions during start-up and warm-up may be greatly reduced by the efficient operation of the exhaust after-treatment device 302. The system of the embodiment 3 does not need to use the heat exchanger 303 in the external circulation since the external circulation is only used to solve the problem of low-temperature start-up of the engine 1.

The specific working process is as follows:

When the engine 1 is to be started, the electric heater 205 is first opened, and the first flow regulation valve 403 is opened at the same time. When the electric heater 205 reaches a hot state with a higher temperature, at this moment, the fan 201 is opened, and methanol is injected into the surface of the hot electric heater 205 through the methanol fuel injector 206, wherein the fuel combusts under the action of the high temperature, and is further oxidized by the intake oxidation catalyst 207 close to the electric heater 205; the fuel injected completely combusts or is oxidized to release heat, the temperature of the intake air is further raised, and a flow rate of the intake air is controlled by operation of the fan 201; the air volume of the fan 201, the temperature of the electric heater 205, and the amount of the fuel injected are matched with each other; the flow rate of the intake air needs to satisfy the requirement of complete combustion of the fuel, and cannot enable the heat generated by the electric heater 205 to be largely taken away and the temperature to be lowered to affect the combustion and oxidation of the fuel. The intake air is heated by the electric heater 205 and is heated by the heat released after the fuel combustion and oxidation to form a high-temperature exhaust gas, the temperature is greatly raised, and a high-temperature exhaust gas is formed. Since the engine 1 is not running at this moment, the exhaust gas may only pass through the opened first flow regulation valve 403 and the exhaust pipe 301 to reach the exhaust after-treatment device 302 to heat up. When the catalyst temperature of the exhaust after-treatment device 302 reaches a temperature capable of treating the harmful gas discharged from the engine 1, for example, 300° C., at this moment, the injection of the fuel injector 206 is gradually stopped, the first flow regulation valve 403 is gradually closed, and the engine 1 is started to run; the engine 1 is easily started up due to a high intake temperature, and at the same time, since the catalyst of the exhaust after-treatment device 302 is in an effective operating temperature state, even if a large amount of harmful products are in the exhaust gas generated when the engine 1 starts to run, the harmful products are effectively treated by the catalyst of the exhaust after-treatment device, thereby the problems of difficult low-temperature start-up and generation of a large amount of harmful substances during start-up of the methanol engine 1 are solved.

In the above technical solution, an internal combustion engine with an external circulation system provided by the present application has the following beneficial effects:

the internal combustion engine of the present application is externally connected to an external circulation system through the intake port 104 and the exhaust port 105. The external circulation system may operates in a circulating manner when the engine 1 is not running, a significant raise in intake temperature during intake heating or exhaust heating may be achieved, thereby the cold start-up performance of the internal combustion engine is improved and harmful emissions during cold start-up is reduced, and a compression ignition working mode of a low compression ratio engine 1 is facilitated to be achieved.

Certain exemplary embodiments of the present application are described above by the way of illustration only, there is no doubt that the described embodiments may be modified in a variety of different ways for a person skilled in the art, without deviating from the spirit and scope of the present application. Therefore, the above drawings and descriptions are illustrative in nature and should not be construed as limiting the scope of protection of the claims of the present application.

What is claimed is:

1. A method of operating the internal combustion engine with an external circulation system, wherein the external circulation system includes: the external circulation system communicated with an intake port and an exhaust port of the internal combustion engine;

the external circulation system comprises: an intake heating assembly, an exhaust assembly, and a connecting assembly;
the intake heating assembly is communicated with the intake port of the internal combustion engine and/or the connecting assembly through connecting pipelines;
the intake heating assembly comprises a heater, a fan, an air filter, and an intake connecting pipeline group communicated with an outlet of the fan; the fan is communicated with the intake port of the internal combustion engine and/or the connecting assembly through the intake connecting pipeline group;
the exhaust assembly includes an exhaust after-treatment device and has an exhaust pipe communicated with the exhaust port of the internal combustion engine;
a gas output by the intake heating assembly and/or the exhaust port of the internal combustion engine is discharged through the exhaust pipe of the exhaust assembly; and
the connecting assembly comprises a connecting assembly pipeline and a first flow regulation valve disposed in the connecting assembly pipeline, and the connecting assembly is connected to the intake heating assembly and the exhaust assembly,
wherein an output of the heater is connected to the intake port and to the connecting assembly pipeline, wherein the connecting assembly pipeline bypasses the engine and couples the output of the heater to a catalyst of the exhaust after-treatment device, and wherein the connecting assembly pipeline includes the first flow regulation valve between the output of the heater and the catalyst;
the heater is an electric heater, the internal combustion engine with the external circulation system further comprises a second flow regulation valve and a third flow regulation valve and wherein the method comprises:
while the engine is not running, opening the electric heater and fully opening the first flow regulation valve;
after a temperature of the electric heater reaches a temperature configured for igniting a fuel injected by a fuel injector, injecting the fuel by the fuel injector such that the fuel starts to combust due to the temperature of the electric heater, and such that the temperature of the electric heater and a temperature of an intake oxidation catalyst are increased by heat released from the fuel;
opening the fan to feed circulating air while injecting the fuel, wherein an amount of the circulating air fed is adapted to an amount of the fuel injected, and wherein under an action of continuous electric heating and fuel combustion, an intake temperature of the engine rises, and a temperature of the catalyst of the exhaust after-treatment device continuously increases causing the engine to start to run;
before the engine starts, closing the third flow regulation valve and opening the electric heater;
while the fuel injector injects the fuel, opening the fan for air supply, wherein an air volume of the fan facilitates the fuel combustion, and the fuel in a combusted gas formed after said continuous electric heating and the fuel combustion is sufficiently oxidized by the intake oxidation catalyst to release heat that raises a gas temperature of the gas;
while engine is not running, entering, by the combusted gas, the exhaust pipe of the external circulation system through the first flow regulation valve to reach the exhaust after-treatment device such that the catalyst of the exhaust after-treatment device is heated;
raising a temperature of air reaching the connecting assembly pipeline, wherein the engine starts to run when the temperature of the air reaching the connecting assembly pipeline reaches a first preset temperature, and the first flow regulation valve is closed;
after the engine runs for a plurality of cycles and a temperature of an exhaust gas discharged from the engine reaches a second preset temperature injecting the fuel at an end of a compression stroke in a cylinder of the engine;
after the engine starts up and runs and the temperature of the exhaust gas discharged from the exhaust port of the engine further raises, passing the exhaust gas through the exhaust pipe to reach the exhaust after-treatment device for a treatment, opening the third flow regulation valve and closing the second flow regulation valve;
passing intake air through a heat exchanger such that the intake air is heated by exhaust in the heat exchanger to obtain heated air, and
passing the heated air through a pipeline so that the heated air reaches the electric heater;
in response to a temperature of air passing through a first intake connecting pipeline having reached or exceeded the first preset temperature, stopping heating by the electric heater such that the intake temperature of the engine reaches the first preset temperature due to exhaust of the engine to heat the intake air;
adjusting a heating effect of the exhaust of the engine on the intake air by delaying a fuel injection start time to regulate an exhaust temperature so that the gas temperature of the gas that reaches the intake port of the engine is maintained above the first preset temperature;
after the low compression ratio engine enters a predetermined load state, fully or partially closing the third flow regulation valve and opening the second flow regulation valve to regulate the intake temperature so that the intake temperature is maintained at the first preset temperature;
before the engine is started, and after the electric heater is opened, the first flow regulation valve is fully opened and the fan is opened, said injecting, by the fuel injector, includes injecting the fuel onto a surface of the electric heater, such that the fuel combusts and is oxidized by the intake oxidation catalyst, which is adjacent to the electric heater, such that the fuel completely combusts or is oxidized to release heat that raises a temperature of the intake air, and
controlling a flow rate of the intake air by an operation of the fan;
heating the intake air by the electric heater and by the heat released from the fuel completely combusting or from oxidation of the fuel by the intake oxidation catalyst to form the exhaust gas, wherein the passing the exhaust case includes passing the exhaust gas through the first flow regulation valve and the exhaust pipe to reach the exhaust after-treatment device for heating of the exhaust gas; and
when the temperature of the catalyst of the exhaust after-treatment device reaches a treatment temperature for treating a product in the exhaust gas discharged from the engine, stopping injecting of the fuel by the fuel injector and closing the first flow regulation valve.

* * * * *